US008423891B2

(12) United States Patent
De Araujo et al.

(10) Patent No.: US 8,423,891 B2
(45) Date of Patent: Apr. 16, 2013

(54) MANAGEMENT OF PRESENTATION TIMING IN A DISTRIBUTED PRESENTATION ENVIRONMENT

(75) Inventors: Daniel F. De Araujo, Round Rock, TX (US); Kim-Khanh V. Tran, Austin, TX (US); Vi T. Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/103,196

(22) Filed: May 9, 2011

(65) Prior Publication Data
US 2012/0290928 A1  Nov. 15, 2012

(51) Int. Cl.
*G06F 3/14* (2006.01)
(52) U.S. Cl.
USPC ............ 715/273; 715/719; 715/730; 715/734
(58) Field of Classification Search .................. 715/273, 715/719, 730, 734
See application file for complete search history.

(56) References Cited

U.S. PATENT DOCUMENTS

| | | | | |
|---|---|---|---|---|
| 3,750,137 | A | * | 7/1973 | Wong et al. ................... 340/330 |
| 5,437,555 | A | * | 8/1995 | Ziv-El ........................... 434/336 |
| 7,512,887 | B2 | * | 3/2009 | Keohane et al. .............. 715/732 |
| 7,526,726 | B1 | * | 4/2009 | Skwarecki et al. ........... 715/731 |
| 7,715,780 | B1 | | 5/2010 | Beamish et al. |
| 7,747,953 | B2 | * | 6/2010 | Saavedra ....................... 715/730 |
| 7,877,443 | B2 | * | 1/2011 | Lyle et al. ...................... 709/204 |
| 2004/0215784 | A1 | | 10/2004 | Qi et al. |
| 2004/0266412 | A1 | | 12/2004 | Maes et al. |
| 2006/0041686 | A1 | | 2/2006 | Caspi et al. |
| 2006/0168525 | A1 | * | 7/2006 | Tsai et al. ...................... 715/730 |
| 2007/0294623 | A1 | * | 12/2007 | Saavedra ....................... 715/730 |
| 2008/0046930 | A1 | | 2/2008 | Smith et al. |
| 2008/0103766 | A1 | | 5/2008 | Bates et al. |
| 2008/0133664 | A1 | * | 6/2008 | Lentz ............................. 709/204 |
| 2008/0320394 | A1 | | 12/2008 | Womack |
| 2009/0037945 | A1 | | 2/2009 | Greig et al. |
| 2009/0063945 | A1 | | 3/2009 | Bhogal et al. |
| 2010/0169428 | A1 | | 7/2010 | Balasubramanian |
| 2010/0218099 | A1 | * | 8/2010 | van Melle et al. ............ 715/730 |
| 2010/0218120 | A1 | * | 8/2010 | Gaurav et al. ................. 715/753 |
| 2010/0257456 | A1 | | 10/2010 | Lieb et al. |
| 2010/0318399 | A1 | * | 12/2010 | Li et al. ............................ 705/9 |
| 2010/0324963 | A1 | * | 12/2010 | Gupta et al. ....................... 705/9 |
| 2011/0153768 | A1 | * | 6/2011 | Carter et al. .................. 709/207 |

OTHER PUBLICATIONS

IEEE Internet Computing "Intelligent Agents Meet the Semantic Web in Smart Spaces", IEEE Computer Society, Nov. 2004, pp. 69-79.*
IBM Technical Disclosure; (IPCOM000173847D); "Method and System for Updating Slide Transmission Status in Web Conference"; Aug. 25, 2008; 2 pages; IP.com; http://www.ip.com/pubview/IPCOM000173847D.
Jancke et al.; "Presenting to Local and Remote Audiences: Design and Use of the TELEP System"; Technical Report; MSR-TR-99-71; Sep. 13, 1999; 10 pages; Microsoft Research; Redmond, WA 98052.
Wong et al.; "The Multi-Audiences Intelligent Online Presentation System"; FUZZ-IEEE 2009, Korea, Aug. 20-24, 2009; 6 pages; 978-1-4244-3597-5/09.
Tran, Nam T.—Office Action dated Aug. 26, 2010; U.S. Appl. No. 12/345,803.

* cited by examiner

*Primary Examiner* — Stephen Hong
*Assistant Examiner* — Mario M Velez-Lopez
(74) *Attorney, Agent, or Firm* — Yudell Isidore Ng Russell PLLC

(57) ABSTRACT

A data processing system invokes presentation of a presentation element of a distributed presentation by a plurality of devices. The data processing system receives progress reports from the plurality of devices, where the progress reports indicate progress in presenting the presentation element. The data processing system determines whether a quorum threshold of presentation progress has been achieved based upon the progress reports. In response to determining that the quorum threshold of presentation of presentation progress has been achieved, the data processing system presents an indication that a spoken presentation associated with the presentation element can commence. The notification is presented prior to completion of presentation of the presentation element by at least one of the plurality of devices.

15 Claims, 4 Drawing Sheets

MANAGEMENT OF PRESENTATION TIMING IN A DISTRIBUTED PRESENTATION ENVIRONMENT

BACKGROUND OF THE INVENTION

1. Technical Field

The present invention relates in general to data processing, and in particular, to management of present timing in a distributed presentation environment.

2. Description of the Related Art

In many business, academic and social settings, presentations include both a spoken component in which a human presenter orally presents information and an multimedia component in which the spoken component is reinforced and supplemented through the presentation of textual, graphical, numerical, image or video information, typically presented utilizing some information technology (IT) infrastructure. To expand access to presentations and to reduce travel time and cost, many presentations are made utilizing distributed presentation technology in which at least some (and perhaps all) of the presentation participants are located in one or more a different physical locations than the human presenter.

In distributed presentation systems, the human presenter, who is stationed at a presenter's presentation device, typically controls the timing at which elements of the presentation (e.g., slides or charts) are presented by supplying inputs (e.g., mouse clicks or keystrokes) at the presenter's presentation device. The participants, which may have one or more participant presentation devices in network communication with the presenter's presentation device, may view the elements of the presentation after varying delays, which may be due, for example, to network bandwidth limitations and/or differing processing powers of the participants' presentation devices.

Because of the varying delays in the presentation of elements at the participants' various presentation devices, the presenter does not know when to begin speaking to the presentation participants about a next element of the presentation.

SUMMARY OF THE INVENTION

In some embodiments, a data processing system invokes presentation of a presentation element of a distributed presentation by a plurality of devices. The data processing system receives progress reports from the plurality of devices, where the progress reports indicate progress in presenting the presentation element. The data processing system determines whether a quorum threshold of presentation progress has been achieved based upon the progress reports. In response to determining that the quorum threshold of presentation of presentation progress has been achieved, the data processing system presents an indication that a spoken presentation associated with the presentation element can commence. The notification is presented prior to completion of presentation of the presentation element by at least one of the plurality of devices.

DETAILED DESCRIPTION OF ILLUSTRATIVE EMBODIMENT

Figure 1:
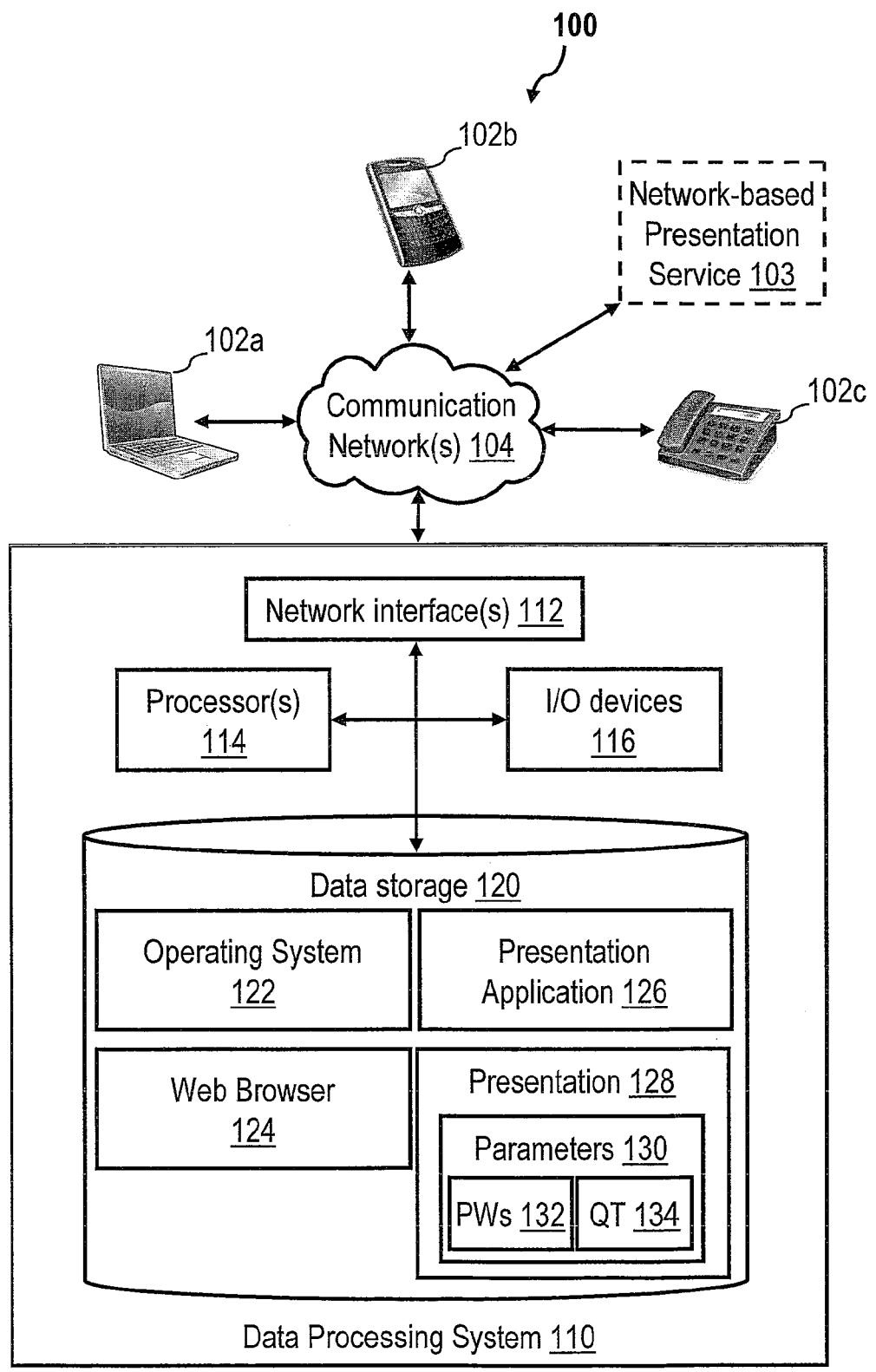
FIG. 1 is a high level block diagram of a data processing environment in accordance with one embodiment.

With reference now to the figures and with particular reference to FIG. 1, there is illustrated a high level block diagram of an exemplary data processing environment 100 in accordance with one embodiment. As shown, exemplary data processing environment 100, which may be employed as a distributed presentation environment, includes a presenter data processing system 110, which can be operated by or on behalf of a human presenter. Data processing system 110 is coupled for communication to one or more circuit-switched or packet-switched communication networks 104, such as wired or wireless local area or wide area network(s), cellular telephony network(s), and/or public switched telephone network(s) (PSTNs). Thus, presenter data processing system 110 may communicate one or more of audio, graphics, data, files, program objects, video, and data in other formats with devices 102*a*-102*c* (e.g., computer systems, mobile telephones, smart phones, landline telephones) via communication network(s) 104. Devices 102*a*-102*c* are merely representative of a myriad of possible devices that can participate in a distributed presentation, including handheld, notebook, desktop, or server computer systems, televisions, set-top boxes, display devices, and/or special purpose presentation devices.

The communication between devices 102-102*c* and data processing system 110 can include voice communication, for example, via a PSTN or voice over Internet Protocol (VoIP) connection, and/or data communication, for example, via one or more of Transport Control Protocol/Internet Protocol (TCP/IP), instant messaging, Simple Mail Transport Protocol (SMTP) or Hypertext Transfer Protocol (HTTP). As described in greater detail below, the communication between data processing system 110 and devices 102 can include the communication of presentation data from data processing system 110 to devices 102 and the communication of presentation progress reports from devices 102 to data processing system 110. The data communicated with each device 102 may vary depending upon the differing capabilities of the devices 102 and the communication networks 104 to which they are coupled.

Still referring to FIG. 1, data processing system 110, which can include one or more physical data processing devices, includes one or more network interfaces 112 that permit data processing system 110 to communicate via communication networks 104. Data processing system 110 additionally includes one or more processors 114 that execute program code, for example, in order to communication presentation data to devices 102. Data processing system 110 also includes input/output (I/O) devices 116, such as a display, keyboard, pointing device, and optionally other attached devices, which receive inputs and provide outputs of the processing performed by data processing system 110. Finally, data processing system 110 includes data storage 120, which may include one or more volatile or non-volatile storage devices, including memories, optical or magnetic disk drives, tape drives, etc.

Data storage 120 stores data and program code, which can be processed and/or executed to present, view and/or control presentation of a distributed presentation. In many cases, devices 102 store and execute corresponding data and program code. In the depicted embodiment, the data and program code stored by data storage 120 of data processing system 110 includes operating system 122, which controls data processing system 110 and provides interfaces through which other program code can access basic services, such as data communication, user interface, access to data storage 120, etc. For example, operating system 122 can be one of the commercially available Windows®, LINUX®, UNIX®, Android™, iPhone OS, BlackBerry OS, or AIX® operating systems.

Data storage 120 additionally includes a web browser 124 by which data processing system 110 can render and interact with locally or remotely stored documents (e.g., HyperText Markup Language (HTML), Extensible Markup Language (XML) and/or documents of other formats) retrieved using Uniform Resource Identifiers (URI). Web browser 124 can be, for example, one of the commercially available Internet Explorer™, Mozilla Firefox™, Safari™, Opera™, or Chrome™ browsers.

Data storage 120 optionally further includes a presentation application 126, which may be, for example, a business productivity application (e.g., a word processing application, spreadsheet application, slide presenting application, email application, chat application, Adobe® Acrobat, etc.) or a multimedia application. Presentation application 126 may be utilized to construct and/or present a presentation 128 comprising a plurality of presentation elements, which may comprise, for example, textual, graphical, numerical, image or video information or containers thereof. In many cases, the presentation elements, which may be formatted as "slides" or "pages" or subsets thereof, may comprise one or more other presentation elements. In some embodiments, presentation application 126 includes support for hosting and/or conducting a distributed presentation in which presentation 128 or components thereof are communicated by presentation application 126 via communication networks 104 to devices 102 and then presented via devices 102. In such embodiments, which may employ a client-server or peer-to-peer architecture, presentation application 126 preferably controls the sequence and timing of delivery to and/or presentation of the plurality of presentation elements by devices 102. Presentation 128 may include or have associated therewith presentation parameters 130 that facilitate management of the timing of the presentation, as described further below.

It will be appreciated upon review of the foregoing description, the form in which data processing system 110 is realized can vary between embodiments. All such implementations, which may include, for example, one or more handheld, notebook, desktop, or server computer systems, televisions, set-top boxes, display devices, and/or presentation devices, are contemplated as embodiments of the inventions set forth in the appended claims.

As indicated by dashed line illustration, data processing environment 100 of FIG. 1 may optionally include a network-based presentation service 103, which is coupled for communication to communication networks 104. Data processing environment 100 preferably includes network-based presentation service 103 in embodiments in which data processing system 110 does not includes a presentation application 126 capable of supporting a distributed presentation as described herein. In an exemplary implementation, network-based presentation service 103, which may be hosted on a server computer remote from but similarly constructed to data processing system 110, provides one or more voice and/or data interfaces through which data processing system 110 and devices 102 can establish communication with network-based presentation service 103 over communication networks 104. In many cases, data processing system 110 and devices 102 establish such communication via a browser application, such as web browser 124. In some cases, the interfaces of network-based presentation service 103 are only accessible to data processing system 110 and devices 102 following a login sequence in which credentials, such as a user id (e.g., username or email address) and conference or presentation ID are supplied. In many cases, the credentials for the presenter are different from those of the participants or audience members of the distributed presentation. As is known in the art, a presenter may upload a presentation, such as presentation 128, to network-based presentation service 103 for distribution to devices 102 or may alternatively or additionally construct and/or direct the distribution of a presentation via network-based presentation service 103.

As noted above, in conventional distributed presentation environments, elements of a distributed presentation are often presented at differing times to different presentation participants due, for example, to network speed and bandwidth limitations and/or the differing processing powers of the participants' presentation devices. This phenomenon is graphically illustrated in FIG. 2, which presents a timing diagram depicting the progress of presentation of an element of a distributed presentation at various devices 102, 110 coupled for communication in a distributed presentation environment, such as data processing environment 100.

Figure 2:
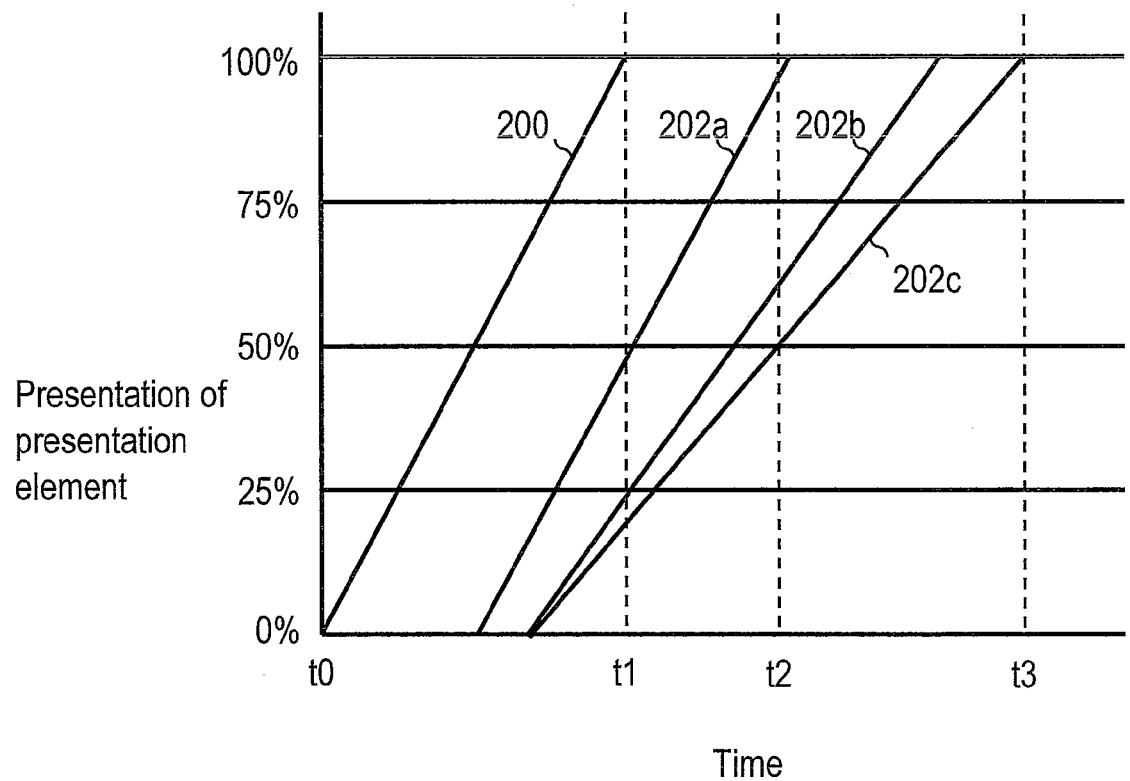
FIG. 2 is a timing diagram depicting the progress of presentation of an element of a distributed presentation at various devices coupled for communication in a distributed presentation environment.

In particular, FIG. 2 depicts a number of curves 200 and 202a-202c (shown to be linear for simplicity), each representing the progress of presentation of an element of a distributed presentation (e.g., a slide, chart or component thereof) at a respective device. For example, curve 200, which represents the progress of presentation of the presentation element at presenter data processing system 100, shows that at time t0, the time the human presenter invokes presentation of the presentation element, zero percent of the presentation element is presented at presenter data processing system 100, and that by time t1, all of the presentation element is presented at presenter data processing system 100. Curves 202a-202c, which represent the progress of presentation of the presentation element at respective devices 102, demonstrate that presentation of the presentation element can begins at the same or differing times and progress at the same or differing rates at the various devices 102 utilized to present the distributed presentation to the presentation participants. In general, the interval between time t0 and the commencement of presentation of the presentation element by a device 102 is chiefly attributable to communication latency on communication networks 104, while the interval between the commencement and end of presentation of the presentation element is chiefly attributable to limitations in the processing capabilities of device 102.

As is apparent from FIG. 2, the human presenter will be ready to begin the spoken presentation associated with the presentation element at least as early as time t1; however, the device 102 corresponding to curve 202c will not complete its presentation of the presentation element until time t3. Consequently, if the human presenter commences the spoken presentation associated with the presentation element in the interval at time t1 and t3, one or more participants participating in the distributed presentation through the device 102 corresponding to curve 202c may not be ready to listen to (and may not understand) the spoken presentation without the aid of the presentation element. To avoid the human presenter verbally requesting verbal status updates on the progress of presentation of the presentation element, it would be useful and desirable for data processing system 110 and/or network-based presentation service 103 to provide a dynamic indication of a time t2 (where t0<t2≦t3) when sufficient progress in the presentation of the presentation element has been reached for the human presenter to commence the spoken presentation associated with the presentation element.

Figure 3:
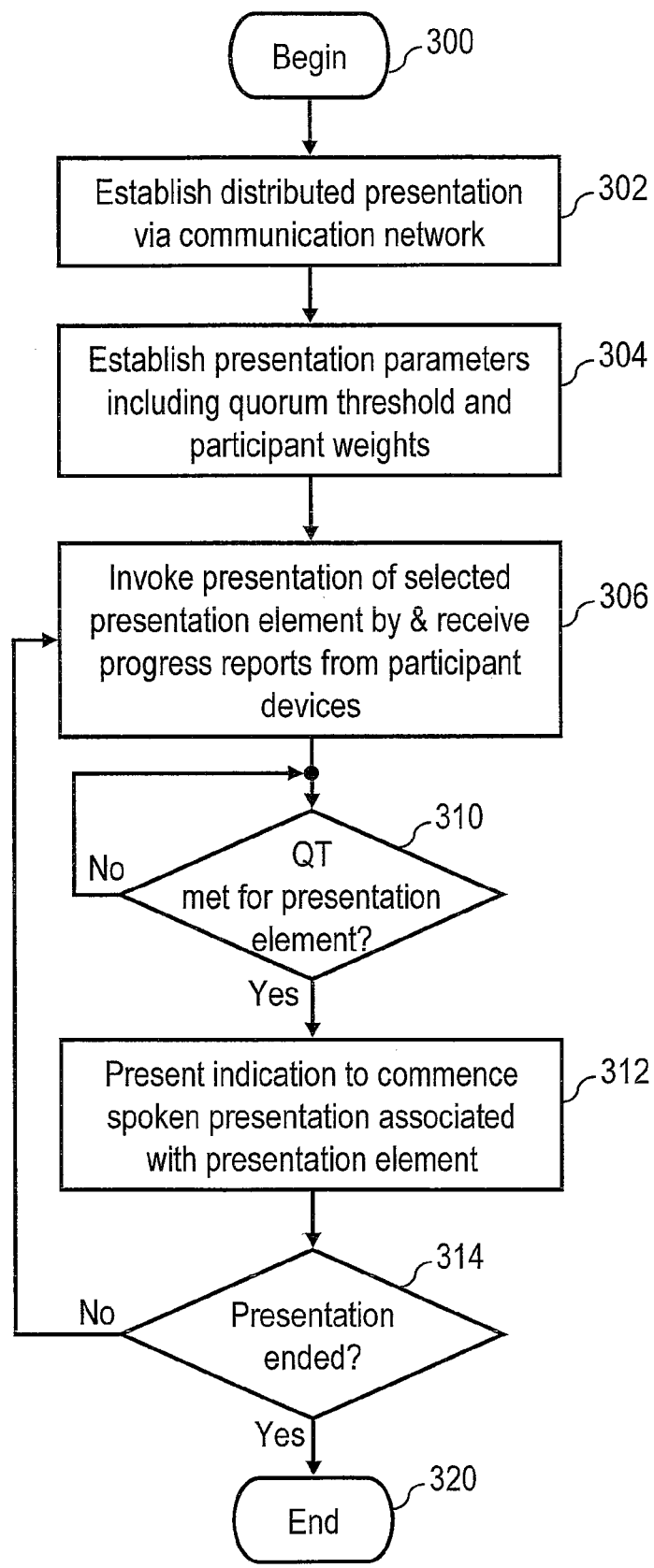
FIG. 3 is a high level logical flowchart of an exemplary process for notifying a presenter to commence a spoken presentation.

With reference now to FIG. 3, there is illustrated a high level logical flowchart of an exemplary process for notifying a presenter to commence a spoken presentation. As a logical flowchart, steps are presented in logical rather than chronological order; thus, the sequence of presentation is not meant to imply a limitation in the order in which the steps can be performed. The illustrated process can be performed, for example, by data processing system 110 in embodiments in which the distributed presentation is controlled by presentation application 126. In other embodiments in which the distributed presentation is controlled by network-based presentation service 103, the process can be performed, for example, by a server or peer computer system hosting network-based presentation service 103.

The illustrated process begins at block 300 and then proceeds to block 302, which depicts establishment of a distributed presentation via communication networks 104. As noted above, the establishment of the distributed presentation at block 302 can be performed by presenter data processing system 110 through the execution of presentation application 126 or by network-based presentation service 103 utilizing either a client-server or peer-to-peer architecture. At block 304, presentation parameters 130 for the distributed presentation are established. In a preferred embodiment, presentation parameters 130, which are utilized to manage the sequence and timing of the presentation of presentation 128, include participant weights (PWs) 132 and a quorum threshold (QT) 134.

PWs 132 indicate the relative importance of the presentation of presentation elements to individual participants and/or groups of participants in the distributed presentation to the presentation. PWs 132 can be assigned by default by presentation application 126 or network-based presentation service 103 or can be user-selectable (e.g., by the human presenter and/or participants in the distributed presentation). In one embodiment, default PWs 132 are assigned by presentation application 126 or network-based presentation service 103 to an invitee list for the distributed presentation and can be individually adjusted, if desired, based upon inputs provided by the human presenter via data processing system 110. The adjustment can be made before or while the distributed presentation is conducted. In one embodiment, PWs 132 vary between zero and one (or 0% and 100%). In another embodiment, PWs 132 are selected from among a limited set of predetermined levels, such as Required (100%), Important (80%) and Optional (50%).

QT 134 is a threshold amount of presentation of a presentation element of a distributed presentation at which the spoken presentation associated with the presentation element can commence. As with PWs 132, QT 134 can be set by presentation application 126 or network-based presentation service 103 by default and can be modified prior to or during the distributed presentation, for example, in response to present inputs into data processing system 110 or participant votes input into devices 102. In a fine-grained embodiment, different QTs 134 can be set for different presentation elements of the distributed presentation.

At block 306, presentation application 126 or network-based presentation service 103 invokes presentation of a selected presentation element by devices 102 (and optionally presenter data processing system 110). As is known in the art, presentation of the presentation element can be invoked in response to a presenter input (e.g., mouse click, button press, keystroke, or verbal or gestural command) received at presenter data processing system 110. Alternatively or additionally, the invocation can be performed automatically responsive to a presentation timing specified by presentation 128.

In response to receipt of the invocation of the presentation element (which may be transmitted to devices 102 separately from or in conjunction with presentation element data comprising the presentation element), at least some of devices 102 preferably provide presentation application 126 or network-based presentation service 103 with one or more presentation progress reports reflecting a percentage of progress of those devices 102 in presenting the presentation element. For example, a device 102 (e.g., through execution of a presentation application 126) may provide a progress report at periodic intervals or when a predetermined percentage (e.g., 25%, 50%, 75%, etc.) of a presentation element has been presented by that device 102. Thus, if the presentation element is a 6 MB slide and a device 102 has presented 3 MB of the slide, the device 102 would report 50%.

Based upon the progress reports, presentation application 126 or network-based presentation service 103 determines at block 310 whether or not the QT 134 currently applicable to the presentation element has been reached. For example, this determination can be made through computation of a quorum figure by summing over all reporting devices 102 the products of the PW 132 applicable to the participant(s) associated with device 102 by the progress percentage reported by that device 102 and dividing the sum by the sum of the PW 132 applicable to the reporting devices 102. Thus, in this embodiment, the quorum figure can be computed as follows:

$$\text{Quantum figure} = \frac{\sum_{1}^{n} PW_i \times PR_i}{\sum_{1}^{n} PW_i}$$

where PW is the PW 132 applicable to the participant(s) associated with device 102, PR is a progress percentage reported by that device 102, and n is a number of reporting devices 102. In at least some embodiments, the quantum figure is not computed until a sufficient time has passed since the invocation of presentation of the presentation element for a threshold number or threshold percentage of devices 102 to provide progress reports or for devices 102 having the highest associated PWs 132 to provide progress reports.

If a determination is made at block 310 that the quantum figure is less than the QT 134 applicable to the presentation element, then the process iterates at block 310. In response to a determination at block 310 that the quantum figure has reached the quantum threshold (or a timeout period has elapsed), the process proceeds at block 312. At block 312, presentation application 126 or network-based presentation service 103 presents an indication (e.g., at time t2 of FIG. 2) via presenter data processing system 110 that the human presenter may commence the spoken presentation associated with the presentation element. Thus, the human presenter is alerted when a sufficient amount of the participants of the distributed presentation have had an opportunity to perceive the presentation element.

Thereafter, presentation application 126 or network-based presentation service 103 determines at block 314 whether or not the distributed presentation has ended, for example, by determining whether the human presenter has entered an input signifying or commanding the end of the distributed presentation. If not, the process returns to block 306, which has been described. If, however, a determination is made at block 314 that the distributed presentation has ended, the process depicted in FIG. 3 terminates at block 320.

Figure 4:
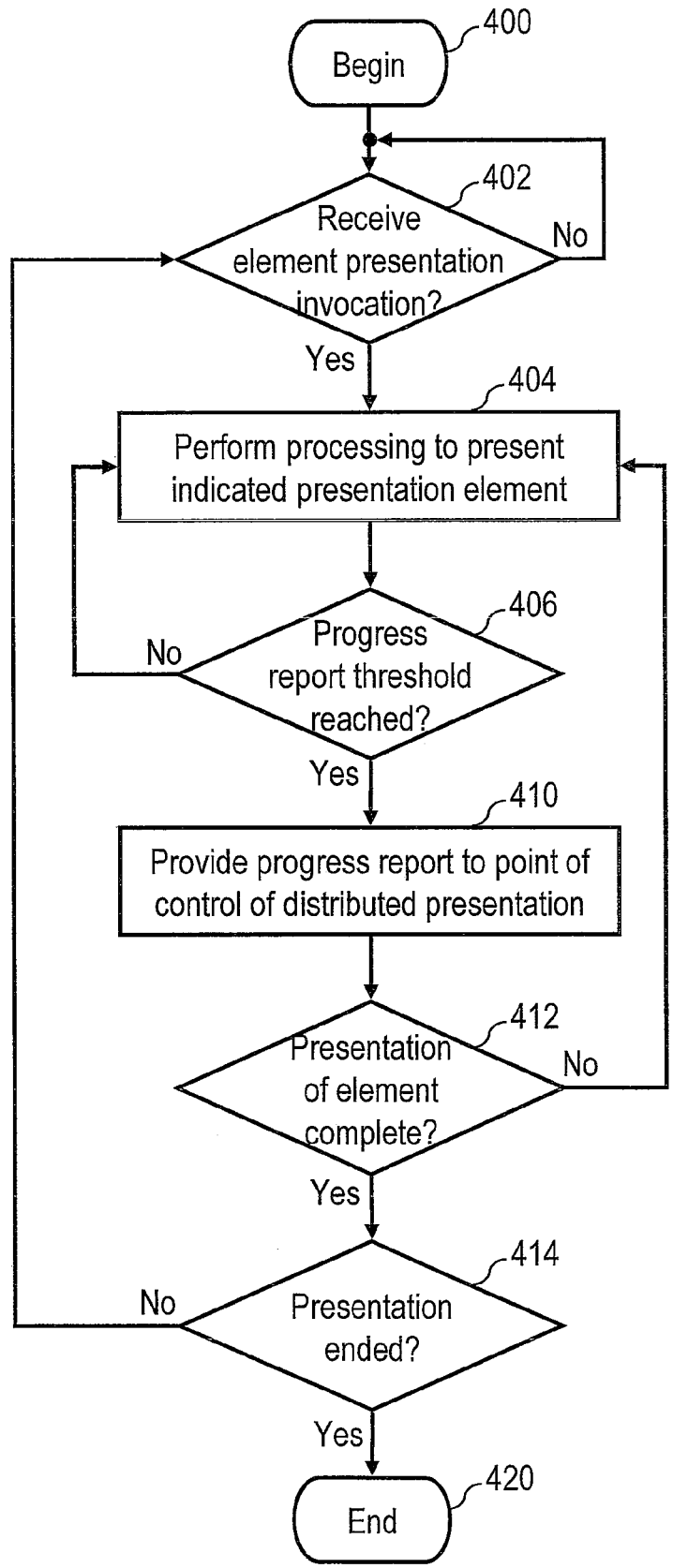
FIG. 4 is a high level logical flowchart of an exemplary process by which a device provides progress reports to a point of control of a distributed presentation.

Referring now to FIG. 4, there is depicted a high level logical flowchart of an exemplary process by which a device 102 provides progress reports to a point of control of a distributed presentation, such as presentation application 126 or network-based presentation service 103. The depicted process can be performed, for example, through the execution of program code, such as a web browser or presentation application, on a device 102.

The depicted process begins at block 400 and then proceeds to block 402, which depicts device 102 receiving an invocation to present a presentation element of a distributed presentation. In various embodiments, the presentation element may be transmitted (i.e., streamed) to device 102 during the distributed presentation via communication network 104 prior to, together with, or following the invocation of its presentation. Alternatively, the presentation element may be preloaded on device 102 by a presentation participant or as part of the preloaded program code of device 102. Preferably, the invocation of presentation of the presentation element and/or the presentation element has associated therewith an indication of the total amount of data comprising the presentation element. In response to receipt of invocation of the presentation of the presentation element, device 102 performs the processing necessary to present the presentation element (block 404). The processing may include, for example, receiving data packets comprising the presentation element from communication networks 104, decapsulating the data packets to extract the data payload of the data packets, rendering at least a portion of the data payload into a raster image in a frame buffer, etc.

As device 102 processes the data comprising the presentation element, device 102 determines at block 406 whether a progress report threshold (e.g., a time interval or amount of processed data) has been reached. If not, the process simply returns to block 404, which has been described. If, however, device 102 determines at block 406 that a progress report threshold has been reached, device 102 transmits a progress report indicating its progress in presenting the presentation element to a point of control of the distributed presentation (e.g., presentation application 126 or network-based presentation service 103), as shown at block 410. As noted above, the progress report may report the progress as a percentage of the total data size of the presentation element.

Following block 410, device 102 determines whether it has completed presentation of the presentation element. If not, the process returns to block 404, which has been described. If, on the other hand, device 102 determines that presentation of the presentation element has completed, the process proceeds to block 414. Block 414 depicts device 102 determining whether the distributed presentation has terminated, for example, in response to an input by a presentation participant stationed at device 102 or in response to an input by the presenter at data processing system 110. In response to a determination at block 414 that the distributed presentation has not terminated, the process returns to block 402, which has been described. Otherwise, the process depicted in FIG. 4 terminates at block 420.

As has been described, in some embodiments a data processing system invokes presentation of a presentation element of a distributed presentation by a plurality of devices. The data processing system receives progress reports from the plurality of devices, where the progress reports indicate progress in presenting the presentation element. The data processing system determines whether a quorum threshold of presentation progress has been achieved based upon the progress reports. In response to determining that the quorum threshold of presentation of presentation progress has been achieved, the data processing system presents an indication that a spoken presentation associated with the presentation element can commence. The notification is presented prior to completion of presentation of the presentation element by at least one of the plurality of devices.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a data storage device (e.g., an optical or magnetic disk, flash memory, tape, etc.) storing program code that can be processed by a data processing system. Further, although the present invention has been described with reference to a human presenter presenting a spoken presentation, it should be appreciated that the presenter may be an automated presenter, such as a programmed data processing system 110 or a robot.

What is claimed is:

1. A method of data processing, comprising:
   a data processing system invoking presentation of a presentation element of a distributed presentation by a plurality of devices;
   the data processing system receiving progress reports from the plurality of devices, the progress reports indicating progress in presenting the presentation element;
   the data processing system determining whether a quorum threshold of presentation progress has been achieved based upon the progress reports and a plurality of different participant weights associated with human participants in the distributed presentation; and
   in response to the data processing system determining that the quorum threshold of presentation of presentation progress has been achieved, the data processing system causing presentation to a human presenter of a notification that a spoken presentation associated with the presentation element can commence, wherein providing the notification comprises providing the notification prior to completion of presentation of the presentation element by at least one of the plurality of devices.

2. The method of claim 1, and further comprising establishing the quorum threshold and the plurality of different participant weights.

3. The method of claim 1, wherein said invoking presentation of the presentation element comprises transmitting an invocation from the data processing system to the plurality of devices over at least one communication network.

4. The method of claim 1, wherein:
   data processing system hosts a network-based presentation service; and
   said invoking presentation of the presentation element comprise invoking presentation of the presentation element in response to receipt via a communication network of an input from a presenter data processing system.

5. The method of claim 1, wherein said receiving progress reports includes receiving one of the progress reports from one of the plurality of devices indicating a percentage of completion in presenting the presentation element.

6. A data processing system, comprising:
a processor; and
data storage coupled to the processor, the data storage including program code that when executed by the processor causes the data processing system to perform:
   invoking presentation of a presentation element of a distributed presentation by a plurality of devices;
   receiving progress reports from the plurality of devices, the progress reports indicating progress in presenting the presentation element;
   determining whether a quorum threshold of presentation progress has been achieved based upon the progress reports and a plurality of different participant weights associated with human participants in the distributed presentation; and
   in response to the data processing system determining that the quorum threshold of presentation of presentation progress has been achieved, causing presentation to a human presenter of a notification that a spoken presentation associated with the presentation element can commence, wherein providing the notification comprises providing the notification prior to completion of presentation of the presentation element by at least one of the plurality of devices.

7. The data processing system of claim 6, wherein the program code further causes the data processing system to perform establishing the quorum threshold and the plurality of different participant weights.

8. The data processing system of claim 6, wherein said invoking presentation of the presentation element comprises transmitting an invocation from the data processing system to the plurality of devices over at least one communication network.

9. The data processing system of claim 6, wherein:
data processing system hosts a network-based presentation service; and
said invoking presentation of the presentation element comprise invoking presentation of the presentation element in response to receipt via a communication network of an input from a presenter data processing system.

10. The data processing system of claim 6, wherein said receiving progress reports includes receiving one of the progress reports from one of the plurality of devices indicating a percentage of completion in presenting the presentation element.

11. A program product, comprising:
a data storage device; and
program code within the data storage device that, when executed by a computer system, causes the computer system to perform:
   invoking presentation of a presentation element of a distributed presentation by a plurality of devices;
   receiving progress reports from the plurality of devices, the progress reports indicating progress in presenting the presentation element;
   determining whether a quorum threshold of presentation progress has been achieved based upon the progress reports and a plurality of different participant weights associated with human participants in the distributed presentation; and
   in response to the computer system determining that the quorum threshold of presentation of presentation progress has been achieved, causing presentation to a human presenter of a notification that a spoken presentation associated with the presentation element can commence, wherein providing the notification comprises providing the notification prior to completion of presentation of the presentation element by at least one of the plurality of devices.

12. The program product of claim 11, wherein the program code further causes the data processing system to perform establishing the quorum threshold and the plurality of different participant weights.

13. The program product of claim 11, wherein said invoking presentation of the presentation element comprises transmitting an invocation from the data processing system to the plurality of devices over at least one communication network.

14. The program product of claim 11, wherein:
data processing system hosts a network-based presentation service; and
said invoking presentation of the presentation element comprise invoking presentation of the presentation element in response to receipt via a communication network of an input from a presenter data processing system.

15. The program product of claim 11, wherein said receiving progress reports includes receiving one of the progress reports from one of the plurality of devices indicating a percentage of completion in presenting the presentation element.

* * * * *